US009988930B2

(12) United States Patent
Elysee

(10) Patent No.: US 9,988,930 B2
(45) Date of Patent: Jun. 5, 2018

(54) COMPRESSOR MONITORING METHOD

(71) Applicant: ROLLS-ROYCE PLC, London (GB)

(72) Inventor: David Andre Elysee, Derby (GB)

(73) Assignee: ROLLS-ROYCE plc, London (GB)

(*) Notice: Subject to any disclaimer, the term of this patent is extended or adjusted under 35 U.S.C. 154(b) by 182 days.

(21) Appl. No.: 14/924,042

(22) Filed: Oct. 27, 2015

(65) Prior Publication Data
US 2016/0130974 A1 May 12, 2016

(30) Foreign Application Priority Data

Nov. 6, 2014 (GB) .................................. 1419742.0

(51) Int. Cl.
F01D 19/00 (2006.01)
F01D 21/00 (2006.01)
F01D 21/14 (2006.01)
F04D 27/00 (2006.01)
F04D 27/02 (2006.01)
F02C 9/26 (2006.01)

(52) U.S. Cl.
CPC .......... F01D 21/003 (2013.01); F01D 19/00 (2013.01); F01D 21/14 (2013.01); F02C 9/26 (2013.01); F04D 27/001 (2013.01); F04D 27/0292 (2013.01); F05D 2200/12 (2013.01); F05D 2220/3216 (2013.01); F05D 2260/821 (2013.01); F05D 2270/101 (2013.01); F05D 2270/3013 (2013.01); F05D 2270/44 (2013.01)

(58) Field of Classification Search
CPC .... F04D 27/001; F04D 27/02; F04D 27/0215; F04D 27/0246; F04D 27/0207; F04D 27/0238; F04D 29/4213; F04D 29/464; F04D 29/661; F04D 29/685; F05D 2270/101; F05D 2270/04; F05D 2220/40; F05D 2260/08
See application file for complete search history.

(56) References Cited

U.S. PATENT DOCUMENTS 5,107,674 A 4/1992 Wibbelsman et al.
6,059,522 A 5/2000 Gertz et al.
6,438,484 B1 8/2002 Andrew et al.
(Continued)

FOREIGN PATENT DOCUMENTS

EP 1256726 A1 11/2002
EP 1548285 A2 6/2005
EP 2 423 514 A2 2/2012

OTHER PUBLICATIONS

Apr. 30, 2015 Search Report issued in British Patent Application No. GB1419742.0.
(Continued)

Primary Examiner — Jelani A Smith
(74) Attorney, Agent, or Firm — Oliff PLC

(57) ABSTRACT

A method of predicting the condition of a compressor with respect to rotating stall is disclosed. The method comprises the steps of:
i) comparing the difference between the largest and smallest values of a variable occurring during a time period with a difference threshold, the variable at any given time being dependent on the compressor exit pressure at that time, and
ii) predicting either that the compressor is in rotating stall or that the compressor is not in rotating stall in dependence upon the result of the comparison.

15 Claims, 3 Drawing Sheets

(56) References Cited

U.S. PATENT DOCUMENTS

| | | |
|---|---|---|
| 2002/0184951 A1 | 12/2002 | Bonanni |
| 2008/0232950 A1 | 9/2008 | Stabley et al. |
| 2013/0142617 A1* | 6/2013 | Rossi .................... F04D 27/001 415/1 |
| 2014/0093350 A1* | 4/2014 | Meisner .................. F01D 17/00 415/1 |

OTHER PUBLICATIONS

Mar. 10, 2016 Search Report issued in European Patent Application No. 15191565.

* cited by examiner

COMPRESSOR MONITORING METHOD

The present disclosure concerns a method of predicting the condition of a compressor with respect to rotating stall, an apparatus for performing the method and a computer readable medium. The method may have particular application in gas turbine engines and especially with respect to a gas turbine engine start sequence.

Discussion of the background to the disclosure in the context of a gas turbine engine start sequence is for convenience only and is not intended to be limiting. It will be appreciated that prediction of the condition of a compressor with respect to rotating stall may be desirable in a gas turbine engine even outside of a starting sequence. Further the invention may additionally have application to compressors used outside of the field of gas turbine engines, positive displacement or otherwise.

In order for successful initiation of stable combustion to occur in a gas turbine engine there must be sufficient flow generated by the compressor(s) through the combustor. Further, in a gas turbine engine having multiple compressors, the flow must be sufficient in order that pressure losses generated by an upstream compressor have dropped sufficiently for a downstream compressor to clear rotating stall. Current engine starting logic allows fuel on and ignition when a set of conditions are met, these conditions being assumed to indicate that there is sufficient flow to the combustor and for high pressure compressor rotating stall to have been cleared. Existing conditions require thresholds for shaft speed and turbine gas temperature (TGT) to be reached. Monitoring TGT is a relatively crude way of guarding against there having been insufficient ventilation of a warm engine core to overcome the impact of rotor bow on high pressure compressor rotating stall clearance.

In order to meet desired start reliability over a wide range of starting conditions, the thresholds are set conservatively. In many cases however this unnecessarily and undesirably increases starting time. Nonetheless in particularly arduous starting conditions even the conservative thresholds may be insufficient to prevent a failed start attempt. Consequently, and in some recognition of the need for a compromise between starting reliability and starting time, the starting logic typically includes a second start attempt where the first start attempt fails.

According to a first aspect of the invention there is provided a method of predicting the condition of a compressor with respect to rotating stall comprising:
 i) comparing the difference between the largest and smallest values of a variable occurring during a time period with a difference threshold, the variable at any given time being dependent on the compressor exit pressure at that time, and
 ii) predicting either that the compressor is in rotating stall or that the compressor is not in rotating stall in dependence upon the result of the comparison.

Compressor exit pressure fluctuation is a good indicator of the condition of the compressor with respect to rotating stall. By checking for the greatest fluctuation in a variable that is dependent on the compressor exit pressure and comparing this to a predetermined threshold indicative of rotating stall clearance, greater accuracy may be obtained in predicting rotating stall clearance than with the prior art methods previously described.

In some embodiments the variable at any given time is equal to the compressor exit pressure at that time. Preferably however the variable at any given time is dependent on both the compressor exit pressure at that time and a lagged compressor exit pressure. It may be for example that the variable at any given time is equal to the lagged compressor exit pressure subtracted from the compressor exit pressure at the relevant time. Use of the lagged compressor exit pressure may offer a convenient and efficient way of extracting the amplitude of the fluctuation in the compressor exit pressure. The lagged signal may also allow smoothing of the value of the variable, reducing the impact of noise in the compressor exit pressure reading.

In some embodiments the lagged compressor exit pressure is time dependent. The lagged compressor exit pressure may for example be recursively updated.

This may mean that the lagged compressor exit pressure is better suited for use at the given time (e.g. accounting better for the condition of the compressor and/or an associated wider system and prevailing operating conditions).

In some embodiments the lagged compressor exit pressure at any given time is calculated in accordance with a first order recursive filter. The lagged compressor exit pressure at any given time may for instance be calculated in accordance with the formula:

$$P_{lag} = \frac{((P_{raw})_n \times \Delta t) + (TC \times (P_{lag})_{n-1})}{TC + \Delta t}$$

Where $P_{raw}$ is the compressor exit pressure, n is a software iteration number, $\Delta t$ is the length of time for one software iteration and TC is the time constant defining a degree of lag applied. Use of $P_{lag}$ calculated in this way may smooth the value of the variable that is dependent on the value of $P_{lag}$.

In some embodiments the method is performed only when the compressor is rotating above a particular speed. It may for example be known that rotating stall will not have been cleared below this speed. Alternatively it may be that the condition of the compressor with respect to rotating stall is only of interest above this speed.

In some embodiments the method is repeated for a plurality of time periods. It may therefore be that if the compressor is initially in a rotating stall condition but is later no longer in a rotating stall condition, the method may be used to indicate when the compressor is no-longer in rotating stall.

In some embodiments the time periods overlap. It may be for example that a new time period is started at each software iteration, with each time period lasting for the same number of software iterations (e.g. ten). In this case the largest and smallest values of the variable for consecutively started time periods would, for each time period, be selected from among nine variables common to the time periods and one non-common variable. By overlapping time periods a revised prediction concerning the compressor condition in terms of rotating stall can be made at each software iteration.

In some embodiments a prediction of rotating stall having been cleared is made only where there is sufficient consistency in the results of the comparisons such that an integrator counter limit is reached, with a prediction that rotating stall has not been cleared being made otherwise. This adds extra certainty to the prediction, ensuring that there is a consistent indication that rotating stall has been cleared before clearance is given. This may avert a spurious prediction of rotating stall clearance based on a limited number of excursions beyond the threshold. The use of the integrator counter may also allow any clearance of rotating stall to stabilise before a prediction of rotating stall clearance is made.

In some embodiments the integrator counter is incremented or decremented in accordance with the result of each comparison, incrementing and decrementing nonetheless occurring only up to and down to the counter limit and a minimum value respectively.

In some embodiments the compressor is installed in a gas turbine engine.

In some embodiments the compressor is a high pressure compressor.

In some embodiments the method is performed prior to initiation of combustion in the gas turbine engine. Initiation of combustion may be delayed at least until a prediction of rotating stall clearance is made. Where the method is performed as part of an engine start method it may be used to increase the reliability of engine start and/or reduce the time required for engine start.

In some embodiments the method further comprises initiating fuel flow and fuel ignition in response to prediction of rotating stall clearance.

According to a second aspect of the invention there is provided an apparatus arranged to perform the method of the first aspect. The apparatus may for example comprise one or more computers programmed to perform the method of the first aspect. In some embodiments the apparatus further comprises one or more sensors arranged to detect and send compressor exit pressure measurements to the computer.

According to a third aspect of the invention there is provided a computer readable medium having a computer program recorded thereon, wherein the computer program is adapted to make a computer execute the method according to the first aspect.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
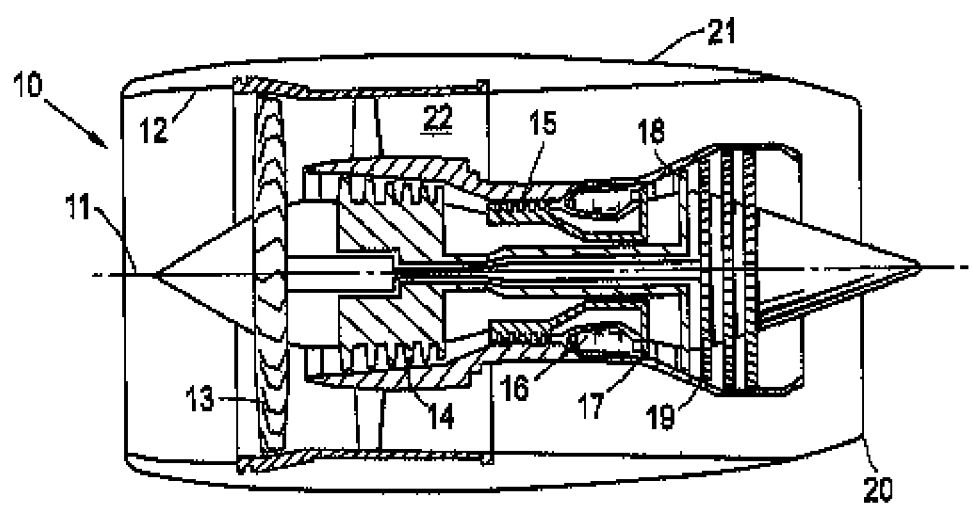
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
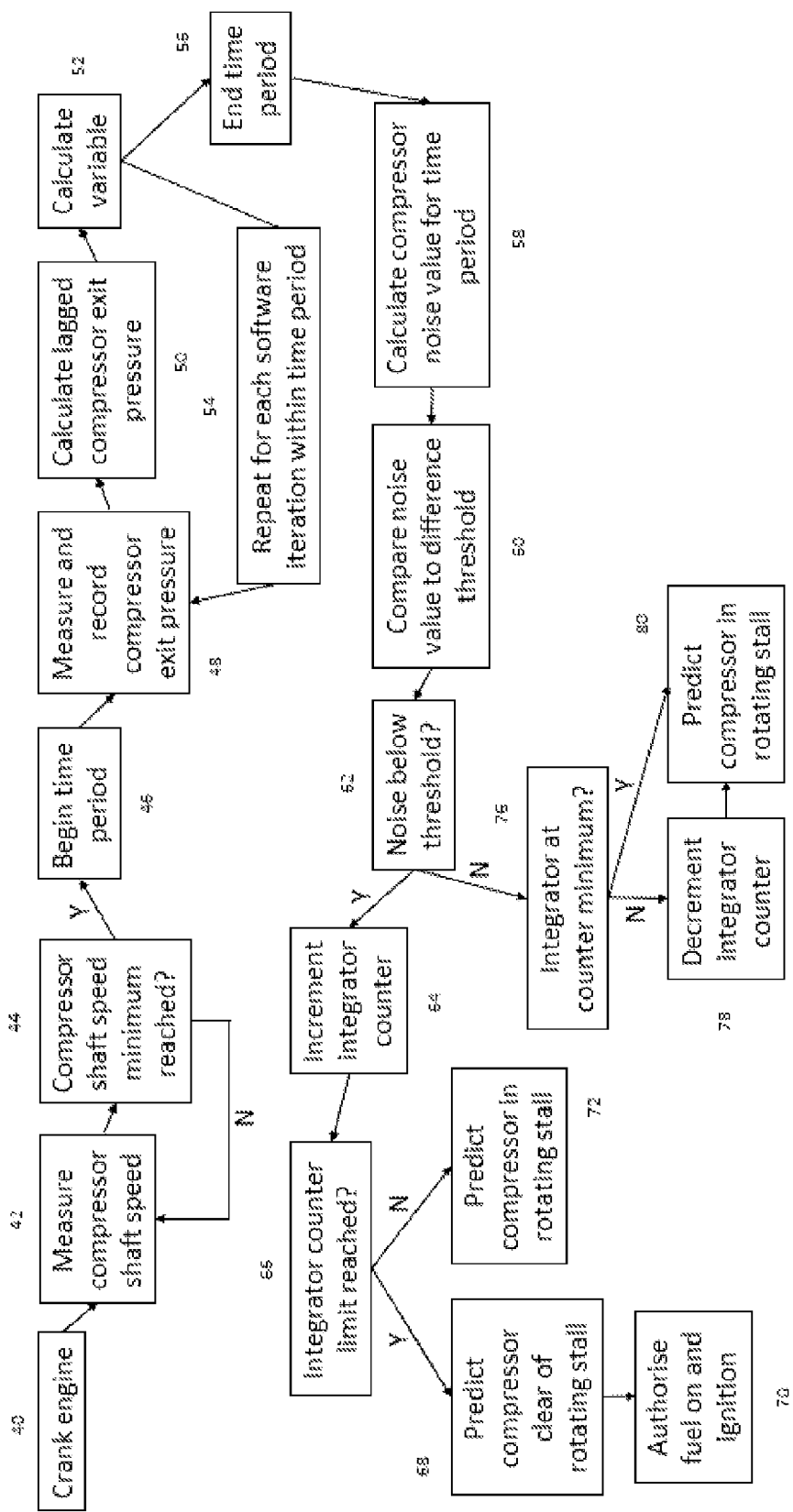
FIG. 2 is a method step diagram for an embodiment of the invention.

With Reference now to FIG. 2, elements of a starting procedure of a gas turbine engine (such as that shown in FIG. 1) are discussed. At step 40 the gas turbine engine is cranked e.g. by using an air turbine starter or external electricity supply to turn an electrical starter-generator of the gas turbine engine. The high pressure shaft and a high pressure compressor connected thereto are therefore rotated.

In accordance with steps 42 and 44 the speed of the high pressure shaft is repeatedly measured until it has reached a minimum predefined speed.

Once the minimum high pressure shaft speed has been reached, the beginning of a time period of a predefined duration (e.g. approximately 250 ms) is defined at step 46.

For the duration of the time period measurements and records are made at each software iteration (e.g. 25 ms or 40 Hz) of the high pressure compressor exit pressure at step 48. The compressor exit pressure is detected by a pressure sensor located immediately downstream of the high pressure compressor. The sensor may for instance be located in a cavity to the side of the gas path.

In addition to there being measurement and recording of the compressor exit pressure at each software iteration, a computer of the gas turbine engine also calculates a lagged compressor exit pressure for the high pressure compressor at step 50. The lagged compressor exit pressure is a first order recursive (therefore time dependent) lag. It is calculated according to the following formula:

$$P_{lag} = \frac{((P_{raw})_n \times \Delta t) + (TC \times (P_{lag})_{n-1})}{TC + \Delta t}$$

Where $P_{raw}$ is the compressor exit pressure, n is a software iteration number, $\Delta t$ is the length of time for one software iteration and TC is the time constant defining a degree of lag applied. The lagged compressor exit pressure produces a smoother profile over time than the raw compressor exit pressure measurements. As will be appreciated in other embodiments the computer need not be part of the gas turbine engine, but could instead be an aircraft computer or even a computer remote from the engine and aircraft.

Finally, at each software iteration, the value of a variable is calculated at step 52. The variable is dependent on both the recorded compressor exit pressure and the lagged compressor exit pressure calculated during that iteration. Specifically the variable at any given time and at the specific software iteration is equal to the lagged compressor exit pressure subtracted from the compressor exit pressure.

Repetition of steps 48, 50 and 52 occurs at step 54.

Following the expiration of the time period a noise value is calculated for the time period at step 58. The noise value is equal to the difference between the largest and smallest variable values calculated for the time period. This value indicates degree of fluctuation in the compressor exit pressure over the time period.

At step 60 the noise value is compared to a difference threshold. The difference threshold is selected in accordance with a degree of compressor exit pressure fluctuation at which the high pressure compressor is clear of rotating stall. If the noise value is below the difference threshold (as checked at step 62) this tends to indicate that the high pressure compressor has cleared rotating stall. Nonetheless there may be anomalous or temporary noise value excursions below the threshold while there nonetheless remains a risk of rotating stall. An integrator is therefore used in order to increase reliability.

If the noise value is below the difference threshold an integrator counter is increased at step 64. A check is then made as to whether the integrator counter has reached a counter limit at step 66. The counter limit is set at a level so as to reliably indicate stable rotating stall clearance without unnecessarily delaying start.

If the counter limit has been reached a prediction is made at step 68 that the high pressure compressor has cleared rotating stall and authorisation for fuel on and ignition is give at step 70. Naturally however, at least in some gas turbine engines, other conditions must be satisfied before fuel on and/or ignition is initiated.

If the counter limit has not been reached a prediction that the high pressure compressor is in rotating stall is made at step 72 While authorisation for fuel on and ignition is not therefore given, this authorisation may be considered one step closer if clearance of rotating stall turns out to be stable, because the integrator counter has been incremented towards the counter limit.

If at step 62 the noise value is not below the difference threshold a check is performed at step 76 to establish whether the integrator counter is at a predefined minimum value (e.g. zero). If the integrator counter is not at the minimum value the integrator counter is decreased at step 78 and a prediction that the compressor has not cleared rotating stall is made at step 80. If at step 76 the counter is at the minimum value the method skips straight to step 80 and the prediction that the compressor has not cleared rotating stall.

The method described above is repeated in the sense that a new time period is started 46 at each software iteration and the method for each time period continuing from that point. Because each time period (each of a consistent length) lasts for a plurality of software iterations, the time periods overlap. As will be appreciated the same measurements and calculations 48, 50, 52 are used within each repetition of the method to the extent that they remain relevant to that time period. Further, as will be appreciated, the integrator used for each repetition of the method is the same. The overlap of the time periods mean that a prediction regarding the condition of the compressor with respect to rotating stall is made at each software iteration, based on the cumulative result of that and the previous time periods and their effect on the integrator.

If for any reason the condition with respect to rotating stall cannot be predicted using the above mentioned method, provision is made for a reversion to a back-up method. This could for example be to use shaft speed and turbine gas temperature as described in the background section.

Figure 3:
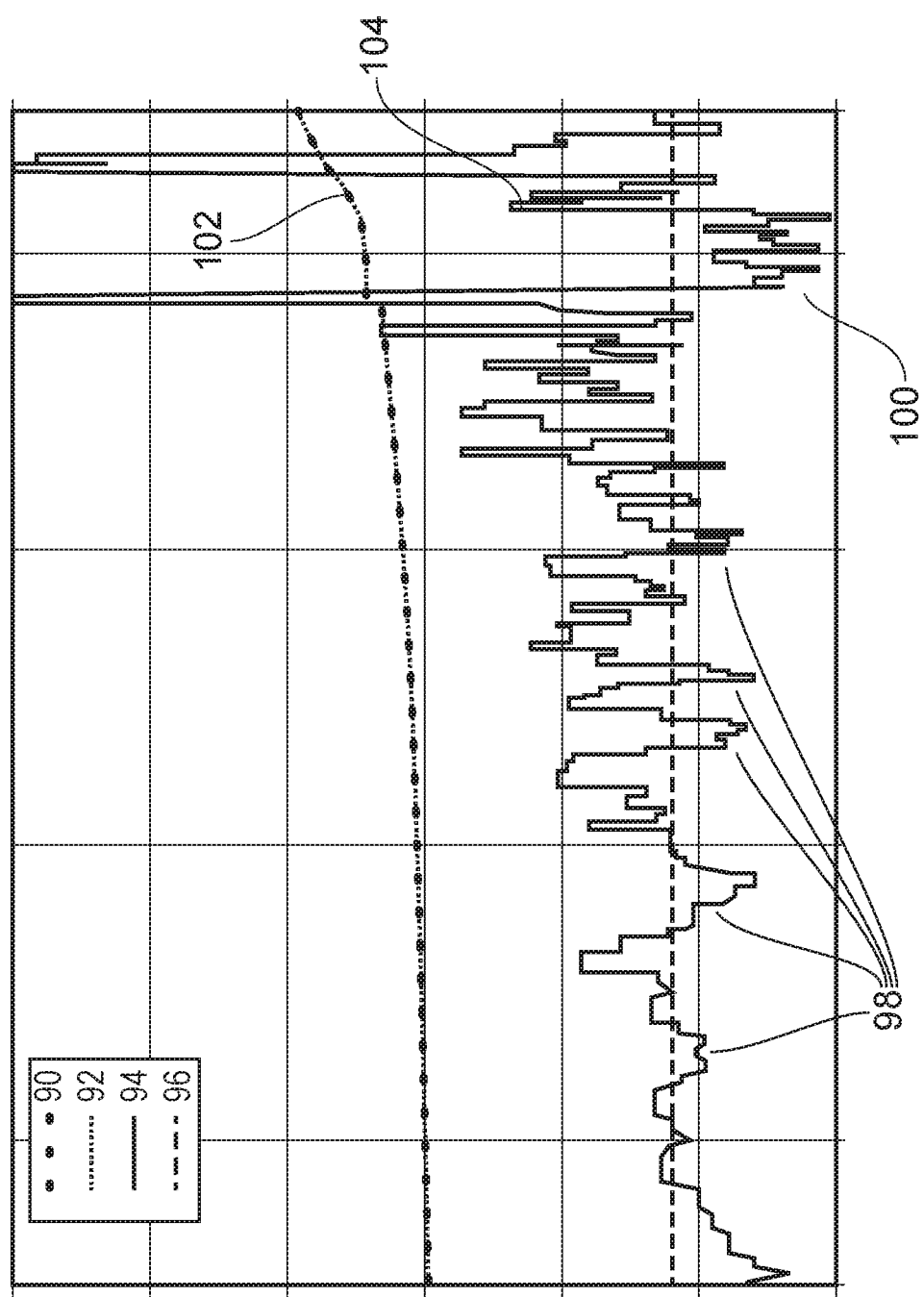
FIG. 3 is a graph showing plots of compressor exit pressure, lagged compressor exit pressure, and a variable dependent on compressor exit pressure and lagged compressor exit pressure occurring during a gas turbine engine start sequence.

Referring now to FIG. 3 an example progression through the gas turbine engine start procedure is shown in terms of the steps of the disclosed method.

Line 90 shows the compressor exit pressure as measured and recorded every software iteration over the course of multiple overlapping time periods and a gradual increase in the high pressure compressor shaft speed.

Line 92 shows the lagged compressor exit pressure as calculated every software iteration over the course the multiple time periods.

Line 94 shows the noise value for each time period as the high pressure compressor shaft speed increases. As will be appreciated the resolution of the noise value is lower than that of the compressor exit pressure and lagged compressor exit pressure, as the noise value is a fixed value for each time period.

Line 96 shows the difference threshold.

The vertical axis of FIG. 3 is pressure in tens of psi with respect to the compressor exit pressure and lagged compressor exit pressure. The vertical axis is pressure in hundredths of psi with respect to the noise value and difference threshold. The horizontal axis is high pressure shaft speed.

As can be seen, as the shaft speed increases, above a certain speed the noise value tends to be above the difference threshold with the exception of a number of short lived excursions 98. The compressor clears rotating stall at point 100, following which there is a sustained drop in the noise value below the difference threshold. At point 102 fuel on and ignition are authorised and occur. Light up activity is visible in the noise value at 104.

It will be understood that the invention is not limited to the embodiments above-described and various modifications and improvements can be made without departing from the various concepts described herein. Except where mutually exclusive, any of the features may be employed separately or in combination with any other features and the invention extends to and includes all combinations and sub-combinations of one or more features described herein in any form of method of predicting the condition of a compressor with respect to rotating stall.

The invention claimed is:

1. A method of determining the condition of a compressor with respect to rotating stall comprising:
   comparing, via a processor, a difference between the largest and smallest values of a variable occurring during a time period with a difference threshold, the variable at any given time being dependent on the compressor exit pressure detected by a pressure sensor at that time, and
   determining, via the processor, that the compressor is in rotating stall when the difference is greater than the difference threshold, and
   determining, via the processor, that the compressor is not in rotating stall when the difference is less than the difference threshold, and thus allowing authorization for fuel and ignition.

2. The method according to claim 1 where the variable at any given time is dependent on both the compressor exit pressure at that time and a lagged compressor exit pressure.

3. The method according to claim 2 where the variable at any given time is equal to the lagged compressor exit pressure subtracted from the compressor exit pressure at the relevant time.

4. The method according to claim 2 where the lagged compressor exit pressure is recursively updated.

5. A method according to claim 4 where the lagged compressor signal at any given time is equal to:

$$P_{lag} = \frac{((P_{raw})_n \times \Delta t) + (TC \times (P_{lag})_{n-1})}{TC + \Delta t}$$

where $P_{raw}$ is the compressor exit pressure, n is a software iteration number, $\Delta t$ is the length of time for one software iteration and TC is the time constant defining a degree of lag applied.

6. A method according to claim 1 performed only when the compressor is rotating above a particular speed.

7. A method according to claim 1 where the method is repeated for a plurality of time periods.

8. A method according to claim 1 further comprising increasing, via the processor, an integrator counter when the difference is less than the difference threshold, a determination of rotating stall having been cleared is made only when the integrator counter reaches an integrator counter limit, with a determination that rotating stall has not been cleared being made otherwise.

9. A method according to claim 8 where the integrator counter is incremented or decremented in accordance with the result of each comparison, incrementing and decrementing nonetheless occurring only up to and down to the counter limit and a minimum value respectively.

10. A method according to claim 1 where the compressor is installed in a gas turbine engine.

11. A method according to claim 10 where the compressor is a high pressure compressor.

12. A method according to claim 10 performed prior to initiation of combustion in the gas turbine engine and initiation of combustion is delayed at least until a determination of rotating stall clearance is made.

13. A method according to claim 10 further comprising initiating fuel flow and fuel ignition in response to determination of rotating stall clearance.

14. An apparatus comprising one or more computers programmed to perform the method of claim 1.

15. A non-transitory computer readable medium having a computer program recorded thereon, wherein the computer program is adapted to make the processor execute the method according to claim 1.

\* \* \* \* \*